United States Patent [19]

Ishida et al.

[11] Patent Number: 4,711,828
[45] Date of Patent: Dec. 8, 1987

[54] CARBON MONOXIDE-OXYGEN FUEL CELL

[75] Inventors: Tetsuyoshi Ishida; Kunio Okiura; Fumihiko Hanayama; Mutsuo Yamada, all of Kure; Yoshijiro Arikawa, Yokohama, all of Japan

[73] Assignee: Babcock-Hitachi Kabushiki Kaisha, Tokyo, Japan

[21] Appl. No.: 866,400

[22] Filed: May 23, 1986

[30] Foreign Application Priority Data

May 27, 1985 [JP] Japan ................ 60-113852
Sep. 26, 1985 [JP] Japan ................ 60-213403
Mar. 13, 1986 [JP] Japan ................ 61-55296

[51] Int. Cl.$^4$ ............................................. H01M 8/08
[52] U.S. Cl. ........................................ 429/12; 429/46; 429/15
[58] Field of Search ............ 429/46, 15, 17, 19, 429/12, 101, 106, 199

[56] References Cited

U.S. PATENT DOCUMENTS 2,384,463  9/1945  Gunn et al. ................ 429/15
3,227,585  1/1966  Langford et al. .......... 429/15
3,510,355  5/1970  Fishman ................... 429/46 X
3,821,028  6/1974  Ziener et al. ............. 429/46 X

OTHER PUBLICATIONS

Wu et al., "Electrocatalytic Oxidation of Carbon Monoxide in a CO/O$_2$ Fuel Cell," *J. Am. Chem. Soc.*, 7456-7457 (1983).

*Primary Examiner*—Anthony Skapars
*Attorney, Agent, or Firm*—Leydig, Voit & Mayer

[57] ABSTRACT

A carbon monoxide-oxygen system fuel cell having overcome various drawbacks of such fuel cell and capable of using CO, as it is, as its fuel without employing any shift converters is provided, which fuel cell is provided with a diaphragm between an anode and a cathode to separate the two electrodes and characterized in using a solution containing at least a monovalent copper and a halide as a complexing agent for the copper, as the electrolytic solution for the anode, and reacting CO in the form of a carbonyl complex of the copper in the electrolytic solution.

19 Claims, 12 Drawing Figures

CARBON MONOXIDE-OXYGEN FUEL CELL

BACKGROUND OF THE INVENTION

1. Field of the Invention

This invention relates to a carbon monoxide-oxygen fuel cell. More particularly it relates to the solution for the cathode of the fuel cell and the cell constitution thereof.

2. Description of the Prior Art

If a $CO/O_2$ fuel cell (carbon monoxide and oxygen being denoted as CO and $O_2$, respectively) is constituted using CO as its fuel and $O_2$ as its oxidizing agent, the cell reaction at the fuel pole or anode and the oxygen pole or cathode is expressed by the following reaction equations (1) and (2):

$$\text{Anode (fuel pole) } CO + H_2O \rightarrow CO_2 + 2H^+ + 2e^- \quad (1)$$

$$\text{Cathode (oxygen pole) } \tfrac{1}{2}O_2 + 2H^+ + 2e^- \rightarrow H_2O \quad (2)$$

If this $CO/O_2$ system fuel cell comes into existence, this is characterized in that (i) the theoretical electromotive force per a single cell is higher and (ii) the ideal heat efficiency $\epsilon_T$ is higher than those in the case of hydrogen-oxygen fuel cell ($\epsilon_T = 0.829$ in the case of $H_2/O_2$ fuel cell, whereas $\epsilon_t = 0.909$ in the case of $CO/O_2$ fuel cell, each at 25° C.).

However, the non-complexed or uncoordinated CO molecule is an electrochemically inert substance; hence the substance cannot advance, as it is, the anodic oxidation reaction of CO as shown in the equation (1) toward the right side. Thus, it has been impossible to constitute a $CO/O_2$ fuel cell.

If it is intended to use such an electrochemically inert CO as a fuel for the fuel cell, CO can be reacted with $H_2O$ by means of a shift converter to convert the CO and $H_2O$ into $H_2$ gas and thereby constitute a $H_2/O_2$ fuel cell. An example of the constitution of a conventional $CO/O_2$ system fuel cell according to this process, and its flow are shown in FIG. 7. In this figure, a CO-containing gas 8 as a fuel is first sent to a high temperature shift converter 2 where CO is reacted with steam 17 at 350° C. to 370° C. to convert most of CO and $H_2O$ into $H_2$, and further sent to a low temperature shift converter 3 where the resulting gas is reacted at 200° C. to 230° C. to reduce the concentration of CO down to an allowable one, followed by feeding the resulting gas to an anode 5 as a $H_2$-rich gas and after a definite reaction, discharging the resulting gas as an exhaust one 10. On the other hand, air 11 is fed to a cathode 6, and after a definite reaction, discharged as an exhaust gas 12. In this figure, numeral 1 shows a cell body, 4 shows an electrolytic chamber, 7 shows a load and 16 shows the transfer direction of hydrogen ion. As described above, the conventional process has had uneconomical drawbacks in that it is necessary to provide a two stage high temperature and low temperature shift converters 2 and 3 and also a large quantity of water is required for the $CO/H_2$ conversion.

SUMMARY OF THE INVENTION

The object of the present invention is to provide a $CO/O_2$ fuel cell which overcomes the drawbacks of the prior art and is capable of using CO, as it is, as its fuel without employing any shift converters, and particularly an anolyte therefor and also a fuel cell using the same.

The present invention in a first aspect is characterized in that in the carbon monoxide-oxygen system fuel cell provided with a diaphragm between an anode and a cathode to separate the two electrodes, a solution containing at least a monovalent copper and a halide as a complexing agent for said copper is used as the electrolytic solution for the anode and carbon monoxide is reacted in the form of a carbonyl complex of the monovalent copper in said electrolytic solution.

The present invention in a second aspect is characterized in that in a $CO/O_2$ fuel cell, a solution obtained by adding to a solution containing a carbonyl complex of monovalent copper, a platinum group metal represented by Pd and Rh among group VIII of the Periodic Table in the form of metal or metallic ion is used as the solution for the anode.

DETAILED DESCRIPTION OF PREFERRED EMBODIMENTS

Figure 1:
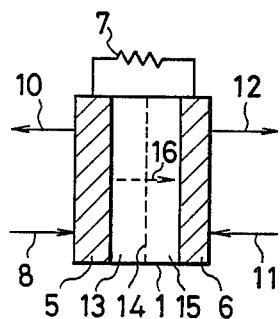
FIG. 1 shows an explanatory view illustrating a $CO/O_2$ fuel cell as an embodiment of the present invention.

Typically in the present invention, a solution containing cuprous chloride, etc. is used as the electrolytic solution for the anode of the carbon monoxide-oxygen fuel cell, and CO is reacted with cuprous ion (hereinafter denoted as Cu(1)) to form a carbonyl complex (hereinafter denoted as Cu(1)·CO) and thereby activate CO so that a reaction expressed by the following equation (3) is advanced in place of the above equation (1):

$$Cu(1)\cdot CO + H_2O \rightarrow CO_2 + 2H^+ + Cu(1) + 2e^- \quad (3)$$

According to research on the present inventors, the reaction of equation (3) has been confirmed as proceeding by a two-stage reaction wherein oxidation of Cu(1)

is antecedent, as shown by the following reaction equations (4) and (5):

$$2Cu(1) \rightarrow 2Cu(2) + 2e^- \quad (4)$$

$$2Cu(2) + Cu(1)\cdot CO + H_2O \rightarrow CO_2 + 3Cu(1) + 2H^+ \quad (5)$$

As described above, a solution containing at least a monovalent copper and a halide as a complexing agent for the copper is used as the electrolytic solution for the anode in the present invention. As compounds affording the above monovalent copper, copper halides such as cuprous chloride, cuprous bromide, etc., cuprous sulfate, etc. are illustrated, but it is preferred to use copper halides, particularly cuprous chloride. Examples of the halide suitable for use as a complexing agent for solubilizing these are hydrogen chloride, hydrogen bromide, halides of alkali metals or alkaline earth metals represented by lithium chloride, sodium chloride, potassium chloride, magnesium chloride, lithium bromide, potassium bromide, magnesium bromide, etc. Among these hydrogen chloride, lithium chloride, sodium chloride, potassium chloride, and mixtures thereof are particularly preferred. The above solution may contain sulfates such as sodium sulfate, sulfuric acid, ammonium chloride or mixtures thereof.

In the present invention, the solution reaction of the above equation (5) has a lower reaction rate than that of the electrode reaction; hence it is rate-determining. Thus, if the solution reaction of the equation (5) is improved, it is possible to further expect the improvement of the performance of the $CO/O_2$ system fuel cell.

Next, the solution for the anode referred to in the present invention in a second aspect will be described.

When a solution wherein CO is absorbed in an aqueous solution of a $Cu(1)Cl/LiCl/PdCl_2$ system is used as the solution for the anode, the reaction at the anode is presumed to occur as follows (however, the following equations are described for an explanatory convenience; hence the present invention should not be construed to be limited thereby):

| (Electrodic reaction) | $2Cu(1) \rightarrow 2Cu(2) + 2e^-$ | (4) |
| (Solution reaction) | $CiLiCl_2\cdot CO + Pd(2) + H_2O \rightarrow$ | (6) |
| | $CO_2 + CuLiCl_2 + Pd(0) + 2H^+$ | |
| | $2Cu(2) + Pd(0) \rightarrow 2Cu(1) + Pd(2)$ | (7) |
| (Total reaction) | $CuLiCl_2\cdot CO + H_2O \rightarrow$ | (8) |
| | $CO_2 + CuLiCl_2 + 2H^+ + 2e^-$ | |

In the above equations, Pd(0) represents metal palladium and Pd(2) represents divalent palladium.

The function and effectiveness of a platinum group member from group VIII of the Periodic Table such as divalent palladium, etc., in the present invention, may be considered that the solution reaction of the formula (5) is divided into two steps through the platinum group. Namely, the CO oxidation reaction of the formula (5) is an oxidation-reduction between Cu(2) and CO, whereas in the case of Pd addition, redox reactions are carried out between Pd(2) and CO, between Cu(1) and Cu(2) and between Pd(0) and Pd(2), respectively.

As the metal or metallic ion of the platinum group among the group VIII, palladium, rhodium, and ruthenium, palladium chloride, palladium bromide, palladium sulfate, rhodium chloride, ruthenium chloride, etc. are usable, and palladium chloride and rhodium chloride are particularly preferred.

The concentrations of the above various compounds are suitably chosen depending on the desired cell voltage, but usually it is preferred that the concentration of of monovalent copper be in the range of 0.5 to 3 mols/l, that of the complexing agent be in the range of 1 to 10 mols/l and that of the platinum group metal such as divalent palladium be in the range of $1 \times 10^{-6}$ to $1 \times 10^{-3}$ mol/l. If the concentrations of the monovalent copper and the complexing agent become high, the solution becomes viscous and the CO oxidation rate is reduced, and at the same time, the cell voltage decreases due to elevation of the concentration of the complexing agent on the electrodic surface. On the other hand, if the concentrations are too low, the concentration of the carbonyl complex of Cu(1) is reduced and hence the CO oxidation rate decreases and similarly the cell voltage is reduced due to increase in the concentration of Cu(2). Further, if the concentration of the platinum group among group VIII is too low, the CO oxidation rate is reduced, while if it is too high, the cost of the solution is raised.

Next, the present invention will be described in more detail referring to the accompanying drawings.

FIG. 1 shows a schematic view illustrating a concrete constitution embodiment and flow of a $CO/O_2$ fuel cell wherein the electrolytic solution of the present invention is used as the anode electrolytic solution. The cell body 1 is separated by a diaphragm 14 into an anodic chamber 13 and cathodic chamber 15, and the anodic chamber 13 is provided with an anode 5 consisting of a porous carbon paper, while the cathodic chamber 15 is provided with a cathode 6 consisting of a carbon paper having a platinum catalyst supported thereon, the respective electrodic chambers being filled with electrolytic solutions. In this cell, a CO-containing gas 8 as a fuel is fed to the cathode 5, the reaction of the equation (3) proceeds, and a $CO_2$ gas-containing exhaust gas 10 is discharged. Air (or $O_2$) 11 is fed to the cathode 6, the above reaction of the equation (2) proceeds and an exhaust gas 12 containing air (or $O_2$) and moisture is discharged. In addition, in this figure, numeral 16 shows the transfer direction of hydrogen ion formed. In the single cell of this gas electrode type, using an aqueous solution of cuprous chloride (2.5 g, 0.025 mol) and lithium chloride (8.5 g, 0.20 mol) dissolved in 1N hydrochloric acid (50 ml) as the anodic electrolytic solution, while using 1N hydrochloric acid aqueous solution as the cathodic electrolytic solution, 100% CO gas as fuel and air were fed to the anode and the cathode, respectively, at a rate of 1,000 ml/min. As a result, output characteristics of an open-circuit voltage of 0.2 V at 20° C. and a closed circuit voltage of 0.1 V at a current density of 0.5 mA/cm² at a load 7 were obtained; thus it was demonstrated to be suitable as a cell.

Figure 2:
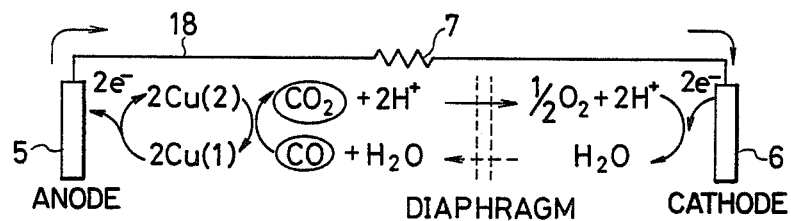
FIG. 2 shows a view explaining the operation principle of the cell according to the present invention.

The operation principle of this cell is shown in a schematic representation in FIG 2. Namely, two Cu(1)s are first oxidized into two Cu(2)s at the anode according to the equation (4) to release two electrons (e−). The two Cu(2)s then oxidize CO activated in the form of Cu(1).CO by the reaction with $H_2O$ to form $CO_2$ and two hydrogen ions (hereinafter denoted as H+), and the two Cu(2)s are regenerated into two Cu(1)s. The two electrons (e−) released at the anode pass through a lead 18 and the load 7 and reach the cathode where ½ of $O_2$ (one of two oxygen atoms) reacts with two H+s to form one $H_2O$ (this reaction is the same as the above reaction of the formula (2)). In the electrolytic solution, the two H+s formed at the anode side pass through the diaphragm, move to the cathode side and are consumed there. As described above, since Cu(1) is regenerated and used, the reaction of the equation (3) occurs as the whole at the anode, while the reaction of the equation (2) occurs at the cathode side; thus, by feeding CO to the anode side and $O_2$ (or air) to the cathode side from the outside, electron flows to the load and electricity can be taken out.

In the electrolytic solution, since $H^+$ moves from the anode toward the cathode, it is preferred to make the $H^+$ concentration of the electrolytic solution one mol/l or higher and also provide a diaphragm to thereby suppress the internal resistance of the cell i.e. the loss of the electromotive force of the cell, to a small one. As the diaphragm, those through which $H^+$ can be selectively permeated may be sufficient. For example, Naphion membrane (tradename of an ion exchange membrane manufactured by Dupont Company) is illustrated. In this case, the diaphragm plays a role of preventing mixing of the electrolytic solutions of both the electrodes to thereby reduce the cell efficiency. Namely, if the diaphragm is absent, the reaction of the equation (2) is combined with that of the equation (3) inside the cell, whereby the reaction energy is not converted into electric energy, but it is liable to be lost in the form of heat energy. In general, the higher the cell operation temperature is, the more the cell reaction is promoted and also the smaller the solution resistance of the electrolytic solution; hence the higher temperature is advantageous, whereas in the case of the electrolytic solution of the present invention, the higher the temperature, the less the fluidity of the CO-absorbing solution, and also the greater the escape of the electrolytic solution; hence it is preferred to operate the cell at 100° C. or lower, particularly at a temperature of 20° to 80° C.

Figure 3:
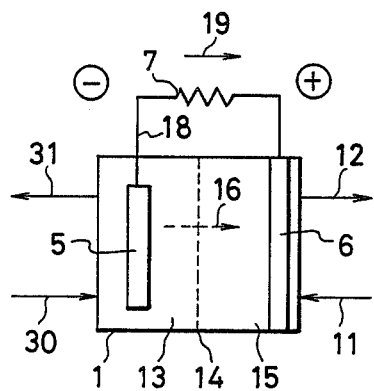
FIG. 3 shows a view illustrating an embodiment of a fuel cell of a fuel solution type.

Next, FIG. 3 shows a view illustrating a flowsheet wherein CO fed in the form of a carbonyl complex at the anode is a $CO/O_2$ fuel cell using the electrolytic solution according to the present invention. Namely, an electrolytic solution 30 having CO absorbed in the form of a carbonyl complex in advance is fed to an anodic chamber 13, the reaction of the equation (3) is caused to occur at an anode 5, and the resulting solution is discharged in the form of a $CO_2$-containing electrolytic solution 31. A cathode 6 is a gas electrode consisting of a carbonaceous, porous body, and air or oxygen 11 is fed to one side of the electrode, while an electrolytic solution is filled on the other side. In addition, in this figure, numeral 18 shows a lead and 19 shows the transfer direction of electrons. According to this process, the resistance of the reaction relative to the equation (4) (mainly due to the diffusion of Cu(2)) between the reactions of the equation (4) and the equation (5) at the anode 5 is reduced by fluidizing the solution, whereby it becomes possible to notably recover the electromotive force of the cell. Further, since it is unnecessary to use a gas electrode at the anode, the electrode structure and operating conditions such as gas pressure become very simple.

Figure 4:
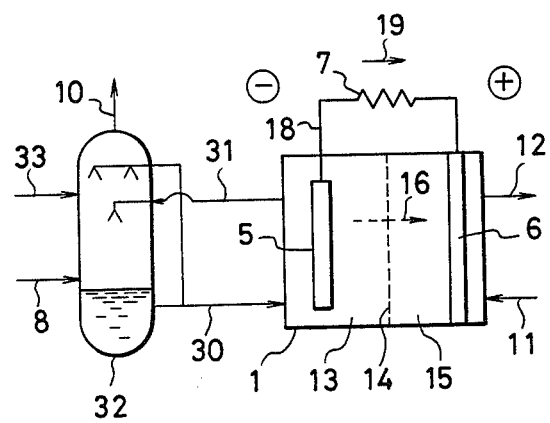
FIG. 4 shows a view illustrating an embodiment of a $CO/O_2$ fuel cell provided with a CO absorption column.

FIG. 4 shows still another embodiment of the present invention wherein a CO absorption column 32 is combined with the $CO/O_2$ fuel cell of FIG. 3 and a flow in the case of such a combination is illustrated. Namely, a CO-containing gas 8 is fed to the CO absorption column 32 and CO is selectively absorbed in an electrolytic solution such as a hydrochloric acid solution of cuprous chloride to form a carbonyl complex, followed by sending this CO complex-containing electrolytic solution 30 to an anodic chamber 13 where the reaction of the formula (3) is caused to occur. A $CO_2$-containing electrolytic solution 31 is returned to the absorption column 32 and reused under feed of water 33. In addition, $CO_2$ is discharged from the top of the column (see numeral 10). The flow at the anode and the principle of the reaction therein are the same as those described above. According to this process, it becomes possible to circulate and use the electrolytic solution at the anode.

According to the present invention, it is possible to use electrochemically inert CO as a fuel for the $CO/O_2$ fuel cell by activating it into the form of a carbonyl complex with an aqueous solution containing cuprous chloride, etc. without converting it into $H_2$ using a shift converter and a large quantity of water. Thus, according to the present invention, it is not only possible to recover the energy of an exhaust gas containing a large quantity of CO, but also it is possible to combine the fuel cell of the present invention with a coal gassification plant or a natural gas plant to thereby develop the cell to a very effective and economical electricity-generating apparatus.

Figure 8:
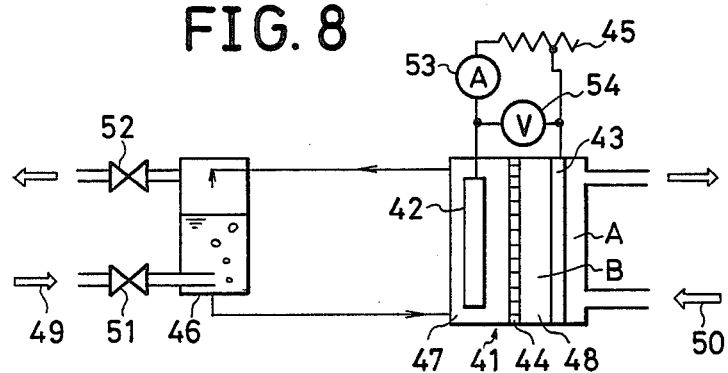
FIG. 8 shows a flow sheet illustrating a $CO/O_2$ fuel cell for explaining another embodiment of the present invention.

FIG. 8 shows an explanatory view illustrating the system of a single cell of a $CO/O_2$ system fuel cell as another embodiment of the present invention. This apparatus is composed of a $CO/O_2$ system fuel cell 41, a CO absorption vessel 46 and instruments. The $CO/O_2$ fuel cell 41 is separated by a diaphragm 44 into an anodic chamber 47 and a cathodic chamber 48, and the anodic chamber 47 is provided with a anode 42 and has a solution for the anode passed thereinto. On the other hand, the cathodic chamber 48 is separated by a cathode 43 consisting of a porous, electrically-conductive body such as a porous carbon paper, into a part A through which a solution for a cathode flows and a part B through which air 50 flows. The solution for the anode absorbs CO gas 49 in the CO absorption vessel 46. Numerals 51 and 52 each show a valve. On the other hand, the anode 42 and the cathode 43 are connected to a variable resistance 45 wherein generated electricity is discharged. The cell current and voltage at the time of the electrical discharge are respectively measured by an ammeter 53 and a voltmeter 54.

In the above fuel cell, when a solution containing a platinum group among group VIII is used as the solution for the anode 42, the cell voltage is increased to a large extent as compared with the case where a solution containing no platinum group is used.

Figure 11:
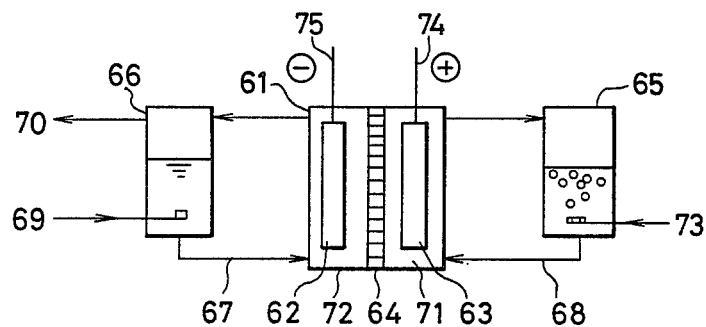
FIG. 11 shows an explanatory view illustrating a fuel cell wherein a solution electrode is used as the cathode.

FIG. 11 shows a view illustrating the fundamental flow of a $CO/O_2$ fuel cell system of the present invention using a solution type electrode as its cathode. This fuel cell system is composed mainly of a body of $CO/O_2$ fuel cell 61, a CO absorption vessel 66 and an $O_2$ absorption vessel 65. The body of $CO/O_2$ fuel cell 61 is provided with an anodic chamber 72 and a cathodic chamber 71 and these two electrodic chambers are separated by a diaphragm 64, as in the case of conventional cell body. The anodic chamber 72 is provided with an anode 62 and a solution for the anode 67 is circulated between the anodic chamber 72 and the CO absorption vessel 66. The cathodic chamber 71 is provided with a cathode 63 and a solution for the cathode 68 is circulated between the cathodic chamber 71 and the $O_2$ absorption vessel 65.

In this embodiment, the cathodic chamber 71 is not partitioned into two parts A and B at the cathode 63, as in the case of the fuel cell of FIG. 8, but the cathode 63 is immersed in a solution for the cathode 68 to form a solution type electrode.

As the solution for the anode 67, a solution containing at least cuprous bromide (Cu(1)Br), a metallic ion of a platinum group and hydrogen bromide is used. As the solution for the anode 68, a solution containing at least hydrogen bromide and bromine is used.

As to the concentrations of the respective components in the solution for the anode 67 and the solution for cathode 68, for example, 0.2 to 3 mols/l of Cu(1)Br, $10^{-4}$ to $10^{-1}$ mol/l of palladium and 2 to 8 mols/l of HBr are preferred.

Besides these components, the solution for the anode 67 and the solution for the cathode 68 may contain a hydrogen halide such as hydrogen chloride, a halide of alkali metals or alkaline earth metals such as lithium chloride, magnesium chloride, lithium bromide, magnesium bromide, etc., a sulfate such as sodium sulfate, sulfuric acid, etc.

Since Cu(1)Br absorbs CO to increase the quantity of carbonyl complex formed, the concentration of Cu(1)Br is preferred to be high, in order to raise the cell voltage. However, since Cu(1)Br is difficultly soluble in water, it is necessary to make the concentration of Cu(1)Br higher to raise the concentration of a complexing agent such as HBr which solubilizes Cu(1)Br, but if the concentration of the complexing agent is too high, the resulting solution becomes viscous and reduces the reaction rate, whereby contrarily the cell voltage often decreases. A higher palladium concentration is preferred, but if the concentration is too high, the resulting solution becomes expensive. A higher $Br_2$ concentration is preferred for promoting the reaction at the cathode, but the concentration is determined by the reaction in the $O_2$ absorption vessel and its reaction rate.

In the CO absorption vessel 66, there is fed CO gas 69, which is absorbed in the solution for the anode 67 to form a carbonyl complex with Cu(1)Br in the solution for the anode. Further, in the solution, CO reacts with a divalent copper (hereinafter denoted as Cu(2)) formed by the reaction of the anode and $H_2O$ to form $CO_2$ gas 70, which is discharged from the CO absorption vessel 66.

In the $O_2$ absorption vessel 65, $O_2$ gas 72 is fed. This $O_2$ gas 73 is absorbed in the solution for the cathode 68 to oxidize $Br^-$ in the solution. As a catalyst for promoting the oxidation reaction of this $Br^-$, nitrogen monoxide, nitrogen dioxide or the like is preferred to be dissolved in the solution for the cathode 68.

According to the above embodiment, it is unnecessary for the cathode to constitute a structure of a three-phase interface electrode (gas electrode), but a structure wherein the electrode is immersed in the solution for the cathode 68 is formed; hence it is possible to construct the cathodic chamber as a simple structure.

Further, when a continuous operation is continued in the fuel cell of the present invention, various electrolytes in the solution for the anode and the solution for the cathode are diffused through the diaphragm, whereby the concentrations of components excluding CO in the solution for the anode and $Br_2$ in the solution for the cathode become unchanged. However, even if Cu(1) mixes in the solution for the cathode 68, this has almost no influence upon the electrodic reaction at the cathode ($Br_2 + 2H^+ + 2e^- \rightarrow 2HBr$); hence no reduction in the cell voltage is observed. This is because the oxidation-reduction potential of $Br_2/2Br^-$ is sufficiently higher than that of Cu(1)/Cu(2). Thus, in the fuel cell of the present invention, reduction is performance with time as observed in the conventional case where a non-halogen system solution is used as the solution for the cathode, does not occur. In addition, CO and $Br_2$ also permeate through the diaphragm, but they are immediately consumed in the reaction; hence this has almost no influence upon the cell voltage although the percentage of the fuel utilized is reduced.

Further, in the case of the cathode of conventional fuel cell, it is necessary for the reaction catalyst to have a solid catalyst such as Pt-Rh, etc. supported thereon, but in this case, there has been observed a drawback that overvoltage increases in the cathodic reaction to reduce the cell voltage, whereas in the case of the fuel cell of the present invention, such a solid, supported catalyst is not used, but carbon monoxide, etc. dissolved in the solution for the cathode is used as the catalyst; hence the above drawback has been overcome and a high cell voltage is obtained.

Figure 12:
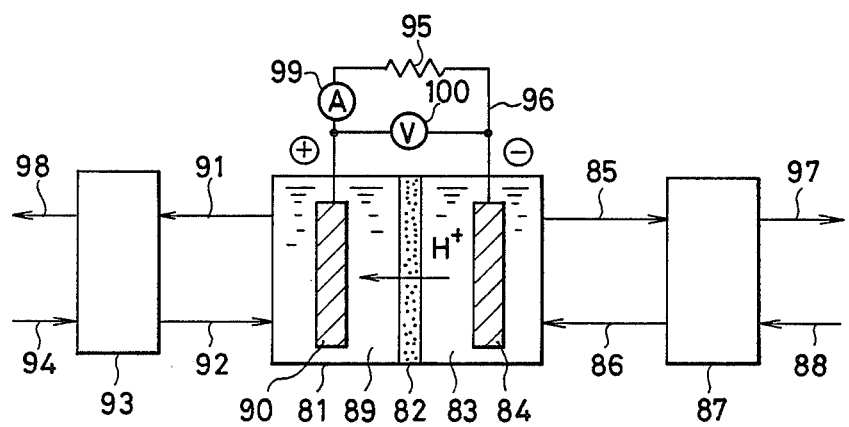
FIG. 12 shows a flowsheet illustrating a Br-Cu system redox type fuel cell according to the present invention.

FIG. 12 shows a schematic diagram illustrating a Br-Cu system redox fuel cell provided with regeneration apparatuses 87 and 93 for the solution for the anode and that for the cathode, separately from the cell body. This cell body 81 is composed of an anodic chamber 83, a cathodic chamber 89 and a $H^+$-selectively permeating membrane 82, the respective electrodic chambers are provided with an anode 84 and a cathode 90, each composed of a material such as carbon, and a load 95, an ammeter 99 and a voltmeter 100 are respectively connected by means of a lead 96.

A regenerated solution for the anode 86 is fed from the regeneration column 87 to the anodic chamber 83, while a regenerated solution for the cathode 92 is fed from the regeneration column 93 to the cathodic chamber 89, and electromotive reactions are caused to occur at the respective electrodes 84 and 90, whereby it is possible to take out electricity at the load 95.

The present invention will be described in more detail by way of Examples.

EXAMPLE 1

Figure 5:
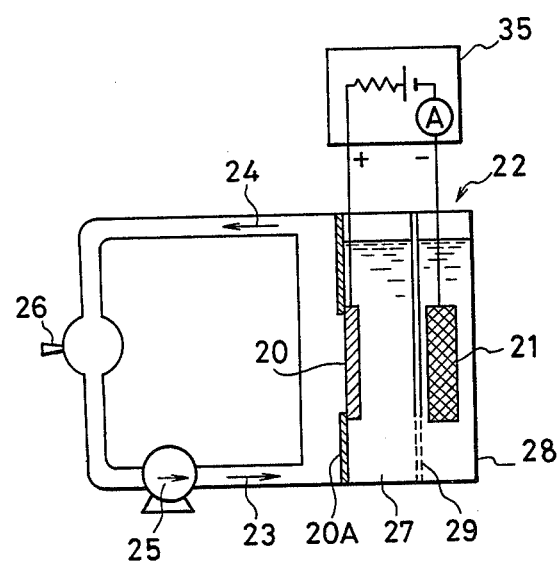
FIG. 5 shows an explanatory view illustrating an experimental device used for confirming the CO oxidation in the fuel cell system of the present invention.

In order to examine the carbonyl complex-forming electrolytic solution, an electrolytic apparatus shown in FIG. 5 was constructed. Namely, in FIG. 5, a gas electrode 20 consisting of a porous carbon paper was fixed to an opening part of a diaphragm 20A in an electrolytic cell; an electrolytic solution 27 was contained on one side thereof; and a CO-containing gas 23 was passed to the opposite side. An exhaust gas 24 was circulated by means of a circulating pump. An electric source 35 was arranged between an opposed electrode 21 and the gas electrode each immersed in the electrolytic solution, and the gas electrode was connected to minus, while the opposed electrode, to plus. In addition, in the figure, numeral 26 represents a gas-sampling port and 29, a glass filter.

As the electrolytic solution, a solution (A) obtained by dissolving cuprous chloride (CuCl) (5.0 g) in 6N hydrochloric acid (HCl) (50 ml) in $N_2$ atmosphere, 85% phosphoric acid ($H_3PO_4$) solution (B) and 6N HCl solution (C), both used in a conventional $H_2/O_2$ fuel cell, were respectively filled in the electrolytic cell shown in FIG. 5, and a gas consisting of CO (20%) and $N_2$ (80%) was circulated at the side of the gas electrode 20 to examine CO oxidation. A current of 17.5 mA was passed between the two electrodes at a solution temperature of 20° C. for 5 hours. The resulting quantity of $CO_2$ formed during the period was measured to obtain results shown in Table 1.

TABLE 1

| Electrolytic solution | | Quantity of CO₂ formed (ml) | Percentage of conversion (%) |
|---|---|---|---|
| A | CuCl/HCl | 3.7 | 10 |
| B | H₃PO₄ | 0 | 0 |
| C | HCl | 0 | 0 |

As apparent from Table 1, no CO oxidation occurs in the electrolytic solution (B) and HCl solution (C) used in a conventional fuel cell, whereas by using a CuCl-containing HCl solution of the present invention, a carbonyl complex is formed to activate CO, whereby CO oxidation proceeds according to the above equation (3).

EXAMPLE 2

A solution obtained by dissolving CuCl (5.0 g) and lithium chloride (LiCl) (12.7 g) in 6N HCl (50 ml), as an electrolytic solution was filled in the electrolytic cell shown in FIG. 5 and a gas consisting of CO (20%) and $N_2$ (80%) was circulated to examine CO oxidation. When a current of 17.5 mA was passed at a solution temperature of 20° C. for 5 hours, the resulting quantity of $CO_2$ formed was 14.5 ml (percentage of conversion: 40%). Namely, it was found that by adding LiCl as a chloride of a metal other than copper to the hydrochloric acid aqueous solution of CuCl, CO oxidation was notably promoted.

EXAMPLE 3

A solution obtained by dissolving CuCl (5.0 g) and magnesium chloride hexahydrate ($MgCl_2 \cdot 6H_2O$) (40.7 g) in 2N HCl (50 ml), as an electrolytic solution, was filled in the electrolytic cell shown in FIG. 5, and a gas consisting of CO (20%) and $N_2$ (80%) was circulated to examine CO oxidation. A current of 17.5 mA was passed at a solution temperature of 20° C. for 5 hours, the resulting quantity of $CO_2$ formed was 9.0 ml (percentage of conversion: 25%).

EXAMPLE 4

A solution obtained by dissolving CuCl (5.0 g) and an aqueous solution of titanium trichloride ($TiCl_3$, 24% by weight) (2.7 ml) in 6N HCl (50 ml), as an electrolytic solution, was filled in the electrolytic cell shown in FIG. 5 and a gas consisting of CO (20%) and $N_2$ (80%) was circulated to examine CO oxidation. When a current of 17.5 mA was passed at a solution temperature of 20° C. for 5 hours, the resulting quantity of $CO_2$ formed was 5.5 ml (percentage of conversion: 15%). It was found that CO oxidation was promoted by adding $TiCl_3$.

EXAMPLE 5

Figure 6:
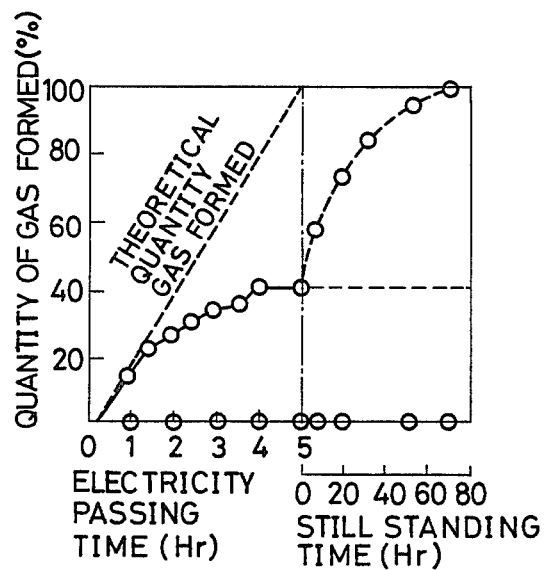
FIG. 6 shows an experimental view illustrating the change with time, of the quantity of $CO_2$ gas formed.
Figure 7:
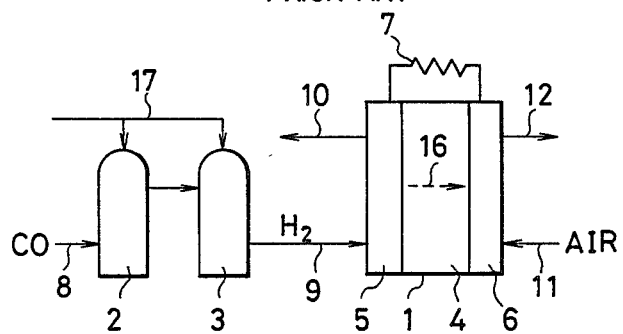
FIG. 7 shows an explanatory view illustrating a $CO/O_2$ fuel cell in the case where a conventional $H_2/O_2$ fuel cell is applied.

A solution obtained by dissolving CuCl (5.0 g), zinc chloride ($ZnCl_2$) (0.7 g) and LiCl (4.2 g) in 6N HCl (50 ml) was filled in the electrolytic cell shown in FIG. 5, and a gas consisting of CO (20%) and $N_2$ (80%) was circulated. A current of 17.5 mA was passed at a solution temperature of 20° C. for 5 hours. Change with time, of the quantity of $CO_2$ formed during the period is shown in FIG. 6. As seen from this figure, the quantity of $CO_2$ formed at the time of completion of electricity-passing was 15 ml (percentage of conversion: 41%), but thereafter by still standing, the quantity of $CO_2$ formed reached 35 ml (percentage of conversion: 96%).

EXAMPLES 6 AND 7

Figure 9:
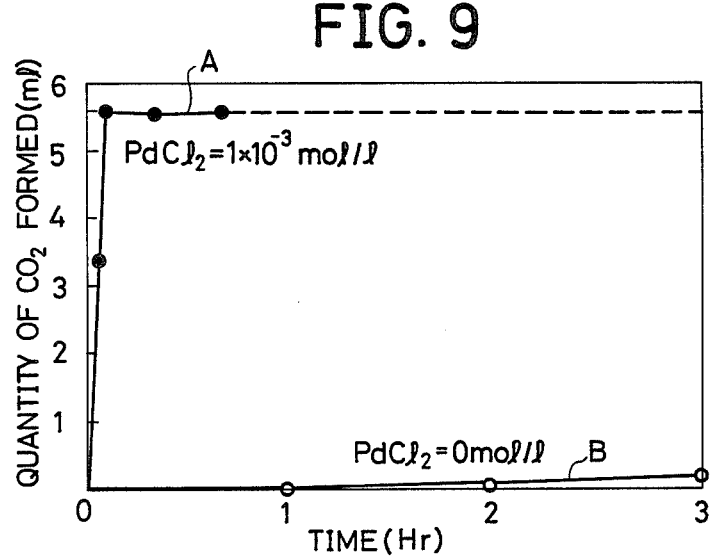
FIG. 9 shows a chart illustrating the test results of the CO oxidation rate of the solution for the anode according to the present invention.
Figure 10:
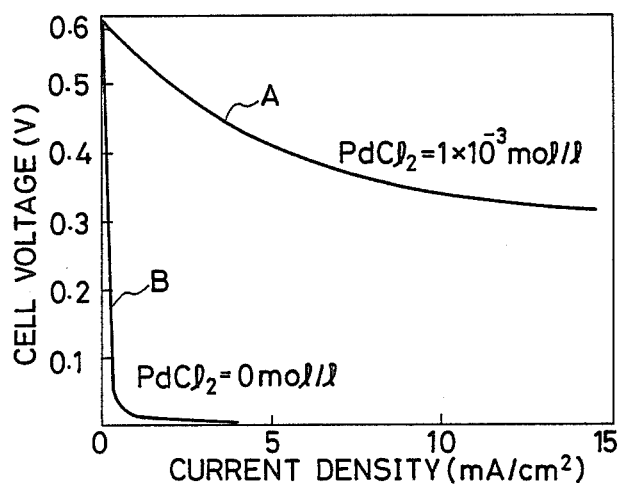
FIG. 10 shows a chart illustrating the test results of the current-voltage characteristics of the cell wherein the solution for the anode according to the present invention is used.

An aqueous solution (50 ml) containing cuprous chloride (Cu(1)Cl) (0.5 mol/l), lithium chloride (LiCl) (4.0 mols/l), hydrochloric acid (1.0 mol/l) and palladium chloride ($PdCl_2$) ($1 \times 10^{-3}$ mol/l) was prepared. A mixed gas consisting of CO of a partial pressure of 0.2 atm and $N_2$ of a partial pressure of 0.8 atm was contacted with the above solution and CO was allowed to be absorbed till the solution was saturated therewith. Next, to the resulting aqueous solution was added an aqueous solution of cupric chloride ($Cu(2)Cl_2$) of 0.5 mol/l (1 ml) and change with time, of the quantity of $CO_2$ formed was measured. The results are shown as A in FIG. 9. In addition, results of the case where no $PdCl_2$ was added are shown as B. The CO oxidation rate was sought from the quantity of $CO_2$ formed during 5 minutes after addition of $Cu(2)Cl_2$. As a result, the CO oxidation rate was 67.2 ml/h. A $CO/O_2$ fuel cell using this aqueous solution as the electrolytic solution in the anodic chamber 47 shown in FIG. 8 and using a sulfuric acid aqueous solution as the electrolytic solution in the cathodic chamber 48 was constituted to carry out an electrical discharge test of the cell. As a result, the cell voltage was 0.4 V at a current density of the electrode of 5 mA/cm². The current-voltage characteristics at that time is shown as A in FIG. 10. In addition, the case where a solution for the cathode having no $PdCl_2$ added is shown as B.

In the above case where no $PdCl_2$ was added, the CO oxidation rate was 0.05 ml/h, and in the electrical discharge test of the cell, the cell voltage was 0.01 V or less at a current density of 5 mA/cm². These results are together shown in Table 2.

TABLE 2

| Example | Composition of anode solution | | | Quantity of Cu(2)Cl added (mol/l) | Temperature (°C.) | CO oxidation rate (ml/h) | Cell voltage V (at i = 5 mA/cm²) |
|---|---|---|---|---|---|---|---|
| | Cu(1) (mol/l) | Complexing agent (mol/l) | Pt group (mol/l) | | | | |
| 6 | CuCl (0.5) | LiCl (4.0), HCl (1.0) | — | $0.5 \times 10^{-5}$ | 25 | 0.05 | 0.01 |
| 7 | CuCl (0.5) | LiCl (4.0), HCl (1.0) | $PdCl_2$ ($1 \times 10^{-3}$) | " | 25 | 67.2 | 0.40 |

From the results in the above Table 2, it was found that when the solution containing $PdCl_2$ as the solution for the anode was compared with the solution containing no $PdCl_2$, the CO oxidation rate in the former case increased to 1,300 times the one in the latter case, and the cell voltage increased by about 0.4 V.

EXAMPLES 8~11

Aqueous solutions were prepared wherein the concentrations of Cu(1)Cl, LiCl and HCl were 0.5, 4.0 and 1.0 mol/l, respectively, as in Example 7, but the concentration of $PdCl_2$ was varied so as to give $5 \times 10^{-6}$, $1\times10^{-5}$, $5\times10^{-5}$ and $1\times10^{-4}$ mol/l. CO gas was allowed to be absorbed in the respective aqueous solutions in the same manner as in Example 7, and also Cu(2)Cl$_2$ was added to examine the effect of Pd metal and Pd metallic ion upon the CO oxidation rate. As a result, the CO oxidation rate lowered as the concentration of PdCl$_2$ lowered, but even in the case of $5\times10^{-6}$ mol/l, the CO oxidation rate was about 80 times the one in the case where Pd or Pd ion was not added.

Further, the cell voltages in the case where the respective solutions were used as the solution for the anode 47 were measured. As a result, in the case where PdCl$_2$ concentration was $1\times10^{-5}$ mol/l or higher, a cell voltage of 0.37 V or more was obtained at a current density of 5 mA/cm$^2$, and the voltage was 0.32 V at a concentration of $5\times10^{-6}$ mol/l. The results are shown in Table 3.

sitions shown in Table 5 were used. The respective solutions for the anode were filled in the regeneration apparatus 87, and fed and circulated to the anodic chamber 83. A mixed gas 88 consisting of CO (20% by volume) and N$_2$ (80% by volume) was fed as the regenerating gas for the solution for the anode to the apparatus 87 for regenerating the solution for the anode, at a rate of 100 ml/min. On the other hand, air 94 was fed at the same rate to the apparatus 93 for regenerating the solution for the cathode. Numerals 97 and 98 each represent an exhaust gas.

The cell terminal voltage after electrical discharge at 5 mA/cm$^2$ for 5 hours is shown in No. 1 of Table 5. For comparison, the terminal voltages of a Br-Ti system redox type fuel cell (No. 3) using a conventional Ti system solution for the anode and a CO/O$_2$ fuel cell (No. 2) using a gas electrode type air pole and a solution for the anode same as that in the present Examples are shown in Table 5.

TABLE 3

| Example | Composition of anode solution | | | Quantity of Cu(2)Cl$_2$ added (mol/l) | Temperature (°C.) | CO oxidation rate (ml/h) | Cell voltage V (at i = 5 mA/cm$^2$) |
|---|---|---|---|---|---|---|---|
| | Cu(1) (mol/l) | Complexing agent (mol/l) | Pt group (mol/l) | | | | |
| 7 | CuCl (0.5) | LiCl (4.0) HCl (1.0) | — | $0.5\times10^{-5}$ | 25 | 67.2 | 0.40 |
| 8 | CuCl (0.5) | LiCl (4.0) HCl (1.0) | Pd($1\times10^{-4}$) | " | " | 31.5 | 0.40 |
| 9 | CuCl (0.5) | LiCl (4.0) HCl (1.0) | Pd($5\times10^{-5}$) | " | " | 16.7 | 0.39 |
| 10 | CuCl (0.5) | LiCl (4.0) HCl (1.0) | Pd($1\times10^{-5}$) | " | " | 7.5 | 0.37 |
| 11 | CuCl (0.5) | LiCl (4.0) HCl (1.0) | Pd($5\times10^{-6}$) | " | " | 4.2 | 0.32 |

EXAMPLES 12~20

Aqueous solutions were prepared wherein the respective kinds of monovalent copper, complexing agent and metal or metallic ion of platinum group were varied, and the CO oxidation rate and the cell voltage were measured in the same manner as in Example 7 to examine the effectiveness of the present invention. The main results are shown in Table 4.

TABLE 4

| Example | Composition of anode solution | | | Quantity of Cu(2)Cl$_2$ added (mol/l) | Temperature (°C.) | CO oxidation rate (ml/h) | Cell voltage V (at i = 5 mA/cm$^2$) |
|---|---|---|---|---|---|---|---|
| | Cu(1) (mol/l) | Complexing agent (mol/l) | Pt group (mol/l) | | | | |
| 12 | CuCl (0.5) | LiCl (5.0), HCl (0.1) | RhCl$_3$ ($1\times10^{-5}$) | $0.5\times10^{-5}$ | 20 | 11.2 | 0.38 |
| 13 | CuCl (0.5) | LiCl (5.0), HCl (0.1) | PdCl$_2$ ($1\times10^{-5}$) | " | 60 | 19.2 | 0.41 |
| 14 | CuCl (0.5) | LiCl (3.0), HCl (2.0) | PdCl$_2$ ($1\times10^{-5}$) | " | 20 | 6.8 | 0.42 |
| 15 | CuCl (0.5) | HCl (5.0) | PdCl$_2$ ($1\times10^{-5}$) | " | " | 6.1 | 0.45 |
| 16 | CuCl (0.5) | NaCl (4.0), HCl (1.0) | PdCl$_2$ ($1\times10^{-5}$) | " | " | 5.4 | 0.52 |
| 17 | CuCl (0.5) | KCl (4.0), HCl (1.0) | PdCl$_2$ ($1\times10^{-5}$) | " | " | 5.0 | 0.56 |
| 18 | CuCl (1.0) | LiCl (4.0), HCl (1.0) | PdCl$_2$ ($1\times10^{-5}$) | " | " | 10.3 | 0.40 |
| 19 | CuI (0.5) | LiI (4.0), HI (1.0) | PdI$_2$ ($1\times10^{-5}$) | " | " | 8.1 | 0.38 |
| 20 | CuBr (0.5) | LiBr (4.0), Br (1.0) | PdBr ($1\times10^{-5}$) | " | " | 8.3 | 0.40 |

EXAMPLE 21

As the solution for the cathode and that for the anode in the apparatus shown in FIG. 12, those having compo-

TABLE 5

| No. | Cathode solution | Anode solution | Temperature (°C.) | Terminal voltage (V at 5 mA/cm$^2$) |
|---|---|---|---|---|
| 1 | HBr (0.5 M) HCl (2 M) | Cu(1)Cl (0.5 M) KCl (2 M) | 25 | 0.60 |
| 2 | 1.5 M H$_2$SO$_4$ | Br$_2$ (0.25 M) HCl (0.5 M) PdCl$_2$ ($10^{-3}$ M) Cu(1)Cl (0.5 M) KCl (2 M) | " | 0.40 |

TABLE 5-continued

| No. | Cathode solution | Anode solution | Temperature (°C.) | Terminal voltage (V at 5 mA/cm²) |
|---|---|---|---|---|
| 3 | HBr (0.5 M) HCl (2 M) Br₂ (0.25 M) | HCl (0.5 M) PdCl₂ (10⁻³ M) TiCl₃ (0.5 M) HCl (2 M) PdCl₂ (10⁻³ M) | " | <0.1 |

EXAMPLE 22

Example 21 was repeated except that the complexing agent of the solution for the anode containing a monovalent copper was varied and a mixed gas consisting of $H_2$ (60% by volume)-CO (20% by volume)-$N_2$ (20% by volume) was used for regenerating the solution for the anode, to constitute a Br-Cu system redox type fuel cell. Electrical discharge was carried out at a current density of 5 mA/cm². The resulting cell terminal voltages and the current densities of the current generated by a cell voltage of 0.5 V were measured. The main results are shown in Table 6.

TABLE 6

| No. | Cathode solution | Anode solution | Terminal voltage (V at 5 mA/cm²) | Current density (mA/cm² at 0.5 V) |
|---|---|---|---|---|
| 1 | HBr (0.5 M) HCl (2 M) Br₂ (0.25 M) | Cu(1)Cl (0.5 M) TiCl₃ (0.5 M) HCl (2.0 M) PdCl₂ (10⁻³ M) | 0.80 | 50 |
| 2 | HBr (0.5 M) HCl (2 M) Br₂ (0.25 M) | Cu(1)Cl (0.5 M) SnCl₂ (0.5 M) HCl (2.0 M) PdCl₂ (10⁻³ M) | 0.75 | 40 |
| 3 | HBr (0.5 M) HCl (2 M) Br₂(0.25 M) | TiCl₃ (0.5 M) HCl (2.0 M) PdCl₂ (10⁻³ M) | 0.80 | 40 |

From the experimental results of Tables 5 and 6, it is seen that when monovalent copper is contained in the solution for the anode, divalent copper formed by electrical discharge is regenerated into monovalent copper not only by $H_2$ but also by CO, and further by adding Ti or Sn to the solution for the anode containing only copper, Ti or Sn is also regenerated by $H_2$; hence the cell voltage becomes higher than that in the case where copper alone is contained. Further, by comparing the experimental results of No. 1 of Table 6 with those of No. 2 and No. 3 thereof, it is seen that when monovalent copper is added to a single system of Ti, the electromotive force is not changed so much since the electromotive force is determined by Ti affording a high cell voltage, but Ti is not only regenerated by $H_2$, but also copper, too, is regenerated by $H_2$ and CO, as shown in the following equations; hence it is possible to generate a large quantity of current as much CO is contained in the base and Cu is contained in the solution for the anode.

The reaction equations of electrical discharge and regeneration of copper in the above Example are shown as follows:

(Electrical discharge) 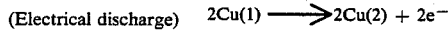 (4)

(Regeneration) 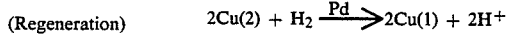 (9)

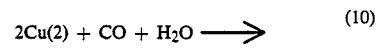 (10)

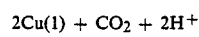

By using the above solution for the anode, it is possible to use not only $H_2$ but also CO-containing process gases, etc. for regenerating the solution for the anode; the range of application to energy recovery process is broadened as compared with the case of a conventional redox type fuel cell; and it is possible to obtain a higher cell voltage and current density than those in the case of the prior art. Further, when the regeneration apparatus is separated from the cell body, it is possible to use it as a transportable cell (if the regeneration is carried out with electric power, as a secondary cell).

What we claim is:

1. In a carbon monoxide-oxygen system fuel cell provided with a diaphragm between an anode and a cathode to separate the two electrodes, an improvement which comprises using a solution containing at least a monovalent copper and a halide as a complexing agent for said copper as the electrolytic solution for said anode, and reacting carbon monoxide in the form of a carbonyl complex of said monovalent copper in said electrolytic solution.

2. An improvement according to claim 1 wherein said cathode is a gas electrode and oxygen is fed to said gas electrode.

3. An improvement according to claim 1 wherein said cathode is a solution electrode.

4. An improvement according to claim 3 wherein the electrolytic solution for said cathode contains the same compound as said halide as a complexing agent of the electrolytic solution for said anode.

5. An improvement according to claim 3 wherein the electrolytic solution for said cathode contains the same compound as said halide as a complexing agent of the electrolytic solution for said anode and said halide is HBr.

6. An improvement according to claim 3 wherein at least one of Br₂ and HBr is made present in the electrolytic solution for said cathode.

7. An improvement according to claim 3 wherein at least one of Br₂ and HBr is made present in the electrolytic solution for said cathode, and this electrolytic solution for said cathode contains the same compound as said halide as a complexing agent of the electrolytic solution for said anode.

8. An improvement according to claim 3 wherein at least one of Br₂ and HBr is made present in the electrolytic solution for said cathode and this electrolytic solution for said cathode contains the same compound as said halide as a complexing agent of the electrolytic solution for said anode, and further said halide is HBr.

9. An improvement according to claim 3 wherein at least one of Br₂ and HBr is present in the electrolytic solution for said cathode and apparatus for regenerating the cathode and the anode after the electrodic reactions are provided separately from the body of the cell.

10. In a carbon monoxide-oxygen system fuel cell provided with a diaphragm between an anode and a cathode to separate the two electrodes, an improvement which comprises using a solution containing at least a monovalent copper, a halide as a complexing agent for said copper and at least one of a metal and a metallic ion of a platinum group, as the electrolytic solution for said anode, and reacting carbon monoxide in the form of a carbonyl complex of said monovalent copper in said electrolytic solution.

11. An improvement according to claim 10 wherein said metal or metallic ion of said platinum group is at least one member selected from the group consisting of Pd, Rh, Ru and ions thereof.

12. An improvement according to claim 10 wherein said cathode is a gas type electrode and oxygen is fed to said gas electrode.

13. An improvement according to claim 10 wherein said cathode is a solution type electrode.

14. An improvement according to claim 13 wherein the electrolytic solution for said cathode contains the same compound as said halide as a complexing agent of the electrolytic solution for said anode.

15. An improvement according to claim 13 wherein the electrolytic solution for said cathode contains the same compound as said halide as a complexing agent of the electrolytic solution for said anode, and said halide is HBr.

16. An improvement according to claim 13 wherein at least one of $Br_2$ and HBr is present in the electrolytic solution for said cathode.

17. An improvement according to claim 13 wherein at last one of Br and HBr is present in the electrolytic solution for said cathode, and the electrolytic solution for said cathode contains the same compound as said halide as a complexing agent of the electrolytic solution for the anode.

18. An improvement according to claim 13 wherein at least one of $Br_2$ and HBr is present in the electrolytic solution for said cathode, and the electrolytic solution for said cathode contains the same compound as said halide as a complexing agent of the electrolytic solution for the anode, and further said halide is HBr.

19. An improvement according to claim 13 wherein at least one of $Br_2$ and HBr is present in the electrolytic solution for said cathode, and apparatuses for regenerating the anode and the cathode after the electrodic reactions are provided separately from the body of the cell.

* * * * *